Figure 10:
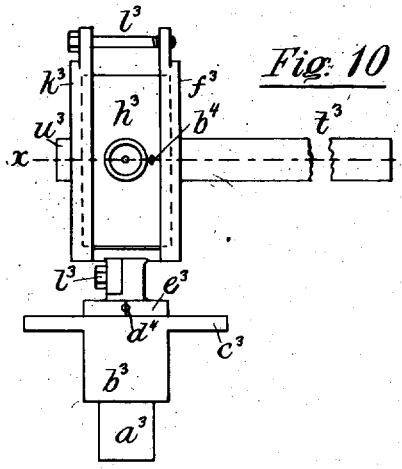

3 Sheets—Sheet 1.
W. FARQUHARSON.
INSTRUMENT FOR MEASURING THE DISTANCE AND HEIGHT OF OBJECTS.
No. 10,908. Reissued Mar. 13, 1888.
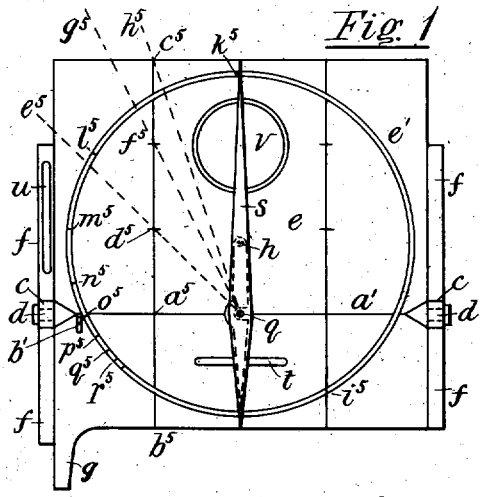
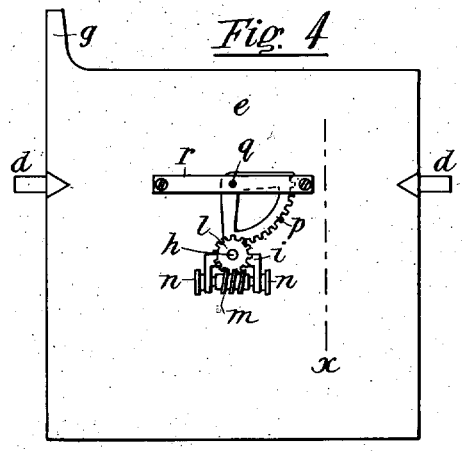
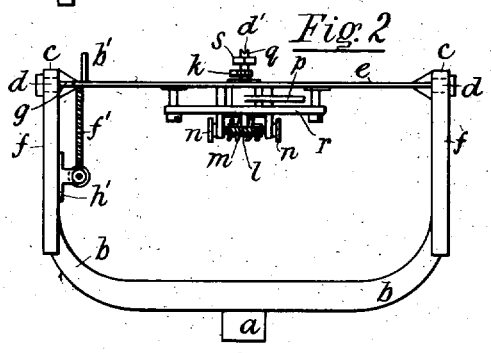
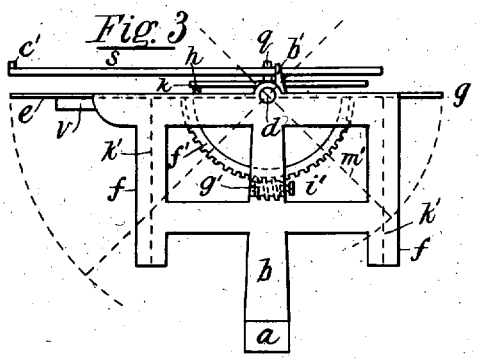
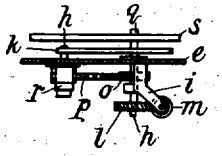
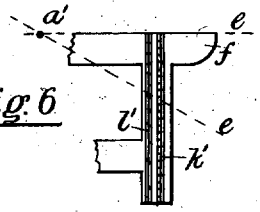
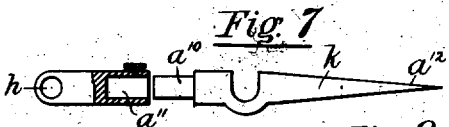
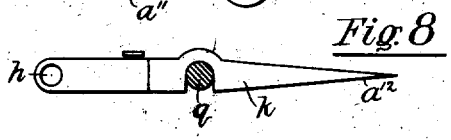
Witnesses.
H. D. Williams
A. G. Holcombe
William Farquharson
Inventor.
per Alfred Speelman
Atty.

W. FARQUHARSON.

INSTRUMENT FOR MEASURING THE DISTANCE AND HEIGHT OF OBJECTS.

No. 10,908. Reissued Mar. 13, 1888.

Witnesses.

H. D. Williams.

A. G. Holcombe

William Farquharson,
Inventor
per Alfred Sherlock
Atty.

3 Sheets—Sheet 3.
W. FARQUHARSON.
INSTRUMENT FOR MEASURING THE DISTANCE AND HEIGHT OF OBJECTS.
No. 10,908. Reissued Mar. 13, 1888.
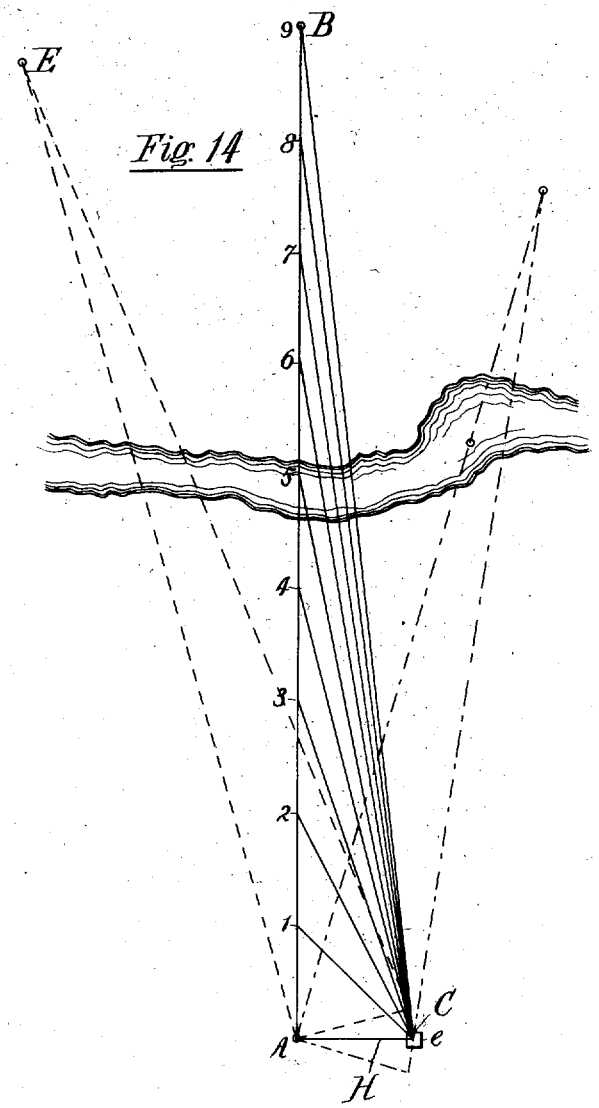
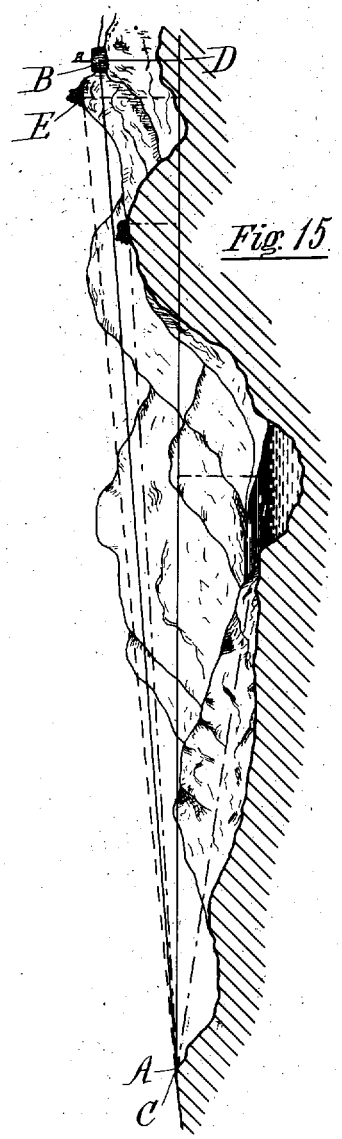
Witnesses.
H. D. Williams.
A. G. Holcombe
William Farquharson
Inventor.
per Alfred Shedloch.
atty.

UNITED STATES PATENT OFFICE.

WILLIAM FARQUHARSON, OF MONTREAL, QUEBEC, CANADA.

INSTRUMENT FOR MEASURING THE DISTANCE AND HEIGHT OF OBJECTS.

SPECIFICATION forming part of Reissued Letters Patent No. 10,908, dated March 13, 1888.

Original No. 353,127, dated November 23, 1886. Application for reissue filed October 28, 1887. Serial No. 253,672.

*To all whom it may concern:*

Be it known that I, WILLIAM FARQUHARSON, a subject of the Queen of Great Britain, of the city of Montreal, in the district of Montreal, Province of Quebec, Dominion of Canada, have invented certain new and useful Improvements in Instruments for Measuring the Distance and Height of Objects; and I do hereby declare that the following is a full, clear, and exact description of the same.

To obtain data relative to distant objects by means of the surveying-instruments now in use it is necessary to resort to trigonometrical calculations.

The object of this invention is to provide means for measuring the distance between and the height of objects in a more efficient manner than heretofore, and to give some of the resulting measurements by direct indications or by simple ratios, and thereby save considerable time in obtaining the desired information.

My invention involves the use of two distinct instruments or devices, which will be here referred to as the "cross-staff" and the "distancer," respectively.

The cross-staff consists, essentially, of two sighting devices or telescopes secured together with their lines of collimation crossing and at right angles to one another; a frame fitted to rotate in a vertical plane, and in which one of the sighting devices is held adapted to rotate on its axis, so that the second sighting device may be revolved on the axis of the other one in a plane at right angles thereto, the point of crossing of the lines of collimation being on the axis of the rotating frame. The support of this frame is carried by a horizontal turn-table, and scales of degrees are provided to indicate the angles through which the various parts are moved.

The distancer comprises a rotating telescopic or sighting device, a table constructed to oscillate on a horizontal axis, and to carry the sighting device, the axis of which is at right angles to the table and passes through its horizontal axis, divided circles marked on or attached to the table, graduated to indicate the tangents of the angles through which the sighting device is moved, and a pointer fitted on a pivot at the center of the divided circles and actuated by the sighting device, and a scale of equal parts marked on the frame in which the table oscillates, and arranged in such relation to the table as to give a reading therewith from which the height of an object sighted by the sighting device carried by the table may be calculated by ordinary arithmetical proportion. A scale of degrees is also provided to indicate the angle through which the table is moved.

The instruments are mounted on ordinary tripods provided with the usual leveling and adjusting devices. The instruments are provided with levels by means of which they may be accurately set before taking an observation, and embrace other new features of construction, which will be hereinafter described in referring to the accompanying drawings, in which—

Figure 9:
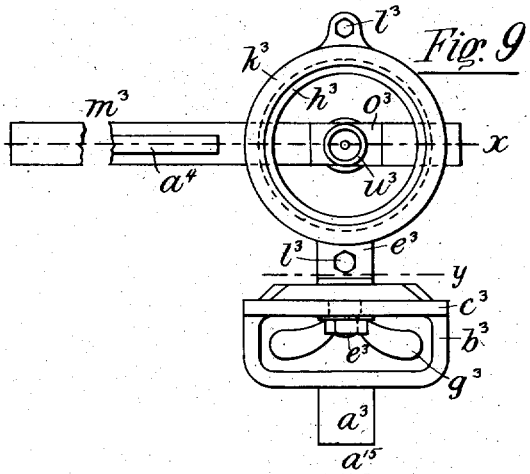
Figure 12:
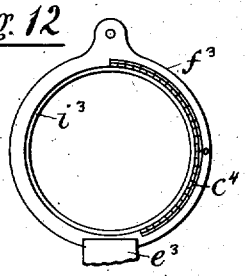
Figure 11:
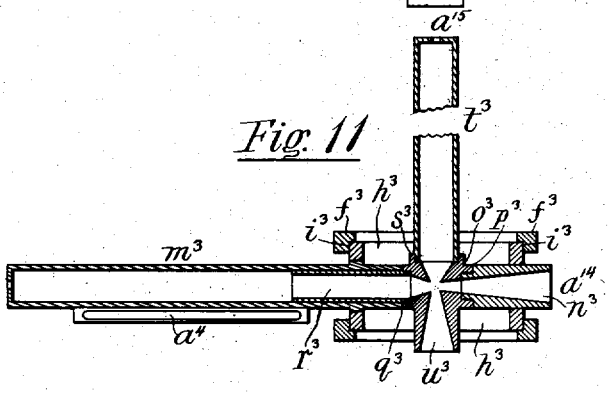
Figure 13:
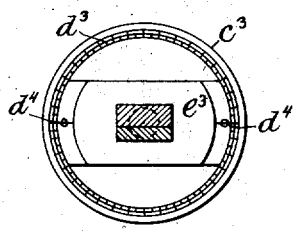

Figure 1 is a plan of the distancer. Fig. 2 is a front elevation of the distancer. Fig. 3 is a left-hand side elevation of the distancer. Fig. 4 is a plan of the table of the distancer inverted. Fig. 5 is a section taken on the line $x$, Fig. 4. Fig. 6 illustrates certain graduated scales on the inner side of the left-hand side of the frame $f$ of the distancer. Figs. 7 and 8 show details of construction of the indicating-hand of the distancer. Fig. 9 is a left-hand side elevation of the cross-staff. Fig. 10 is a front elevation of the cross-staff. Fig. 11 is a horizontal sectional plan taken on the line $x\,x$, Figs. 8 and 9, of the cross-staff. Fig. 12 is a detail of the cross-staff. Fig. 13 is a horizontal section on the line $y$, Fig. 9, and plan of the base of the cross-staff. Fig. 14 is a diagram plan to illustrate the manner of using the distancer and cross-staff. Fig. 15 is a profile view to illustrate the manner of using the distancer and cross-staff.

The supporting-tripods and their leveling-heads, which may be of any ordinary construction, are omitted from the drawings, it being readily understood in what manner my improved cross-staff and distancer are connected by their sockets $a$ and $a^3$ to their respective supports.

Before describing the instruments in detail, I may mention that the particular forms and arrangements of the various parts shown, though clearly embodying my improvements, may in practice be changed by the mechanician and such slight faults of construction as occur therein corrected. So I wish it understood that I do not restrict myself to the construction shown in the drawings.

The main frame of the distancer is composed of side pieces, *f f*, and the cross-bar *b*, from the under side of which projects the socket *a*. In bearings *c c*, formed on the upper edges of the parts *f f* of the frame, are placed the trunnions or journals *d d* of the flat table *e*, the upper surface of which is in one plane with the top edges of the parts *f f* of the frame when it occupies a level position, as shown in Figs. 2 and 3. The line *a'* represents the axis upon which the table turns. As a means for setting the table into different angular positions it has secured to its under side a segmental worm-wheel, *f'*, into which meshes the worm *g'*, held in bearings *h'* in one of the sides *f* of the frame. The worm *g'* is manipulated by means of the milled head *i'*.

On the inner side of one of the sides *f* of the frame lines *k'* are drawn at right angles to its upper edge (see Figs. 3 and 6) and at a given and known distance—such as two, three, or four inches—from the axis *a'* upon which the table *e* turns. These lines *k'* are graduated into inches and suitable parts of an inch, preferably decimals.

Within the line of the scale of inches *k'*, in any desired position, is engraved a line, *l'*, of degrees, from which it can be seen to what angle of inclination from "level" the table *e* is turned to sight any elevated or depressed object. This scale of degrees is not necessary; but it is considered desirable to have it, so that the height of an object may be calculated by the angle of inclination of the table, as well as by the measurement on the scale *k'*. The projection *g* is formed on the table *e*, so that when the table is turned to a great inclination, as indicated by the line *m'*, Fig. 3, it will be long enough to reach across the scale *k'*.

On the upper surface of the table is or are marked a circle or circles, *e'*, graduated to indicate tangents, as will be hereinafter explained, and through the table, at the center of the circles *e'*, extends the spindle *h*, carrying the pointer *k*, and having a bearing in the bracket *i*, secured to the under side of the table. The worm-wheel *l*, fastened to the lower end of the spindle *h*, meshes into the worm *m*, fitted to rotate in bearings in the bracket *i* and provided with milled heads *n n*. Another spindle, *q*, supported by the bracket *r*, passes through the table *e* on the axial line *a* at the foot of the perpendicular passing through the axis of the spindle *h*. This spindle *q* carries at its upper end the sighting device *s*, which is shown as consisting of a long bar having a fine projection, *c'*, at its end, and a notch, *d'*, formed in the end of the spindle *q*. A telescope—such as is used in ordinary levels and other surveying-instruments—may of course be substituted for the simple sighting device here shown. The spindle *q* receives motion from the spindle *h* through the medium of the segmental gear *p* on the spindle *q* and the pinion *o* on the spindle *h*. The sighting device *s* and pointer *k* will be preferably set on their respective spindles *h* and *q*, so that when the sighting device is at exact right angles with the line *a'* the pointer *k* will be parallel with it, or as shown by dotted lines in Fig. 1.

*b'* is a stop projecting from the table *e*, and so situated that when the sighting device *s* is turned to bear against it the device *s* will be exactly in line with the line *a'*. In turning the device *s* from the position shown in Fig. 1 to coincidence with the line *a'* the pointer *k* may, according to the sizes of the respective pitch-circles of the pinion *o* and wheel *p*, be compelled to describe more than a complete circle. It is therefore made in two parts, as shown in Figs. 7 and 8. The point end will ship and unship to enable this movement to be made, the projection $a^{10}$ being accurately fitted to the socket $a^{11}$, so that no variation of position of the point $a^{12}$ will occur by removing and replacing the end of the pointer or by turning it over, as shown. (See Figs. 7 and 8.)

*t* is a level set in the table *e*, and adjusted so that when it shows "level" the table will be level from right to left.

*u* is a level set in one side of the frame *f*, and adjusted so that when it shows "level" the upper surface of the frame *f* will be level. Therefore when the table is set fair with the upper edges of the frames *f*, and they are level, the table will be level also. If desired, the level *u* may be situated in the table *e* instead of the frame *f*, so that the table may be set level in both directions, irrespective of the frame; or, if desired, levels may be placed in both the table and frame.

V is a compass let into the table *e*, and so adjusted that the north and south line is at right angles to the axial line *a'*.

The divisions upon the circles *e'* are arranged thereon and marked to indicate by the pointer *k* the tangents of the angles through which the sighting device *s* moves, starting from a position directly over the axial line *a'*, and, if desired, said divisions may be laid off by taking sights of previously-measured objects, the principle of said scale being elucidated in the following description, reference being also had to Fig. 14.

At any distance in the table *e*, and on the line *a'*, take a point, $a^5$, and through it draw a line, $b^5\ c^5$, at right angles to the line *a'*, and from the line $a^5\ c^5$ cut off a part, $d^5\ a^5$, equal to the distance of the point $a^5$ from the center of the spindle *q*, and draw the line $q\ e^5$. Thus in the right-angled triangle $q\ a^5\ d^5$ we have the two sides $d^5\ a^5$ and $a^5\ q$ equal to one another. Therefore the angle at $d^5$ is equal to the angle at *q*, or forty-five degrees, and an object sighted by the device *s*, when so set and being in the line A B, must be at the same distance from the point A as the point C is from A. Again, from the line $c^5\ b^5$ cut off other parts, $d^5\ f^5$ and $f^5\ c^5$, equal to $a^5\ d^5$, and through the points $f^5$ and $c^5$ draw the lines $g^5\ q$ and $h^5\ q$. Therefore objects in the line A B, sighted by the device $s$ when turned to agree with these lines, will be respectively at double and treble the distance that the point C is from the point A. Thus in Fig. 14 the point 1 is measured by turning the device $s$ to an angle of forty-five degrees from the line $a'$. The positions of the points 2 and 3, Fig. 14, are obtained by turning the device $s$ to agree with the lines $g^5$ $q$ and $h^5$ $q$, respectively, and so on for the positions 4, 5, 6, 7, 8, 9, and, in fact, any desired number of positions. This turning of the device $s$, being caused by operating the mechanism below the table $e$, as before described, also operates the pointer $k$ to an exaggerated degree, corresponding, as it were, on a larger scale, with the movements of the device $s$. The position obtained by setting the device $s$ to agree with the line at $g^5$, Fig. 1, will, we will suppose, cause the pointer $k$ to come to the position-mark or graduation $i^5$ in the circles $e'$. When the device $s$ is turned to agree with the line $h^5$, Fig. 1, or C[2] in Fig. 14, we will suppose that the pointer $k$ will move to the mark $k^5$ in the circles $e'$, and, correspondingly, the marks $l^5$, $m^5$, $n^5$, $o^5$, $q^5$, and $r^5$ represent the positions of the device $s$ and pointer $k$ when they are set to correspond with the points up to $g$, which is B in the line A B, so that if the fort at B is fairly sighted by the device $s$ when it is turned to such a position that the pointer $k$ agrees with or points exactly to the graduation $r^5$ it will be at once known that B is distant from the point A nine times the length of the base A C. Now, if we know the length of the base A C, the distance A B can readily be calculated.

For convenience, the graduations $i^5$ $k^5$ $l^5$ $m^5$, &c., will be indicated by numbers engraved upon the table $e$ corresponding to the number of lengths of the base A C in the line A B, and the distance between each of these graduations may be subdivided to represent fractional parts of the base A C. In other words, the numbers represent the tangents of the angles of the sighting device.

*The cross staff.*—The socket $a^3$ is made in one piece with the head $b^3$, the upper plate, $c^3$, of which is made circular, and upon this head $c^3$ circles are engraved graduated into a scale, $d^3$, of degrees, &c., preferably round the whole circle, as shown. In the center of the plate $c^3$ an opening is formed to receive and fit closely to the part of the foot $e^3$ within it. The lower extension of the foot is provided with a nut, $g^3$, by which the foot $e^3$ and frame $f^3$ may be securely clamped in the required position.

Made in one with the foot $e^3$, and extending above it, as shown in Figs. 10, 11, and 12, is an annular frame, $f^3$, recessed to receive and hold in place a short cylinder, $h^3$, the recess in the frame $f^3$ being closely fitted to the cylinder, so that while it is free to turn within the recess $i^3$ there will not be any lost motion.

$k^3$ is a recessed clamping-plate attached to the frame $f^3$ by screwed bolts $l^3$, which may be adjusted to allow the cylinder to turn with sufficient freedom and without lost motion; also, when desired, may be tightened by the bolts $l^3$ to lock the cylinder in place.

In the cylinder $h^3$ circular openings are formed, so that the axes of these two openings will be in one and the same straight line, which line will pass through the axis of the cylinder at right angles. In one of these openings is screwed a perfectly-trued tube, $m^3$, and through the other, fitting closely therein, passes a short tube, $n^3$. Both of these connect with a center piece, $o^3$, the tube $n^3$ being screwed thereto, as shown at $p^3$, Fig. 11, and the tube $m^3$ abutting against a shoulder of the center piece, as shown at $q^3$. A tube, $r^3$, is screwed into the center piece, $o^3$, and is fitted closely to the tube $m^3$, so that the center piece, $o^3$, may be turned on its axis, the tubes $r^3$ and $n^3$ serving as the trunnions upon which it turns.

Through the above-mentioned parts a sight is formed to take a line directed to any distant object, and the sight must be arranged and the parts fitted so accurately that the turning of the center piece, $o^3$, and the tubes $r^3$ $n^3$ will not vary the line of sight. A socket, $v^3$, is formed, as shown, in one side of the center piece, $o^3$, in which is screwed a sight-tube, $t^3$, and a projection, $u^3$, is formed on the opposite side of the center piece, $o^3$. Through these last above-mentioned parts an accurate sight at right angles to the sight through the tube $m^3$ is formed. Two telescopes joined together at right angles to one another may be substituted for these sighting devices, the essential feature of this instrument being that the point of intersection of their lines of collimation shall be the center upon which both telescopes rock.

On one side of the tube $m^3$ a level, $a^4$, is situated adjusted to indicate when the sight is level. When it is desired to make the tube $t^3$ project from the left side of the cross-staff instead of the right, as shown in Fig. 10, it is only necessary to unscrew the tube $t^3$, turn over the center piece, $o^3$, and with it the tubes $n^3$ and $r^3$, thus bringing the projection $u^3$ to the right side of the cross staff, and again screw the tube $t^3$ into its place.

On the cylinder $h^3$ (see Fig. 10) a zero-mark is formed, as shown at $b^4$, and on the inside of the frame $f^3$ a scale, $c^4$, of degrees is engraved. (See Fig. 12.) These should be so arranged that when the plate is level, as well as the sight and level $a^4$, the zero-mark on the scale of degrees will agree with the zero mark $b^4$. Zero-marks are also formed at $d^4$ on the foot $e^3$ and at opposite points in the circle of degrees $d^3$ on the plate $c^3$.

Having now described a practical embodiment of my improvements in surveying-instruments, I will explain the use of the same by reference to Figs. 14 and 15.

I will suppose that it is simply desired to know (in the first place) the distance from the point A to a distant fort, B. At A, I set up the cross staff. I then turn the sight through the tube $m^3$ to line the center of the fort B, to do which the set-screws $l^3$ and clamping-plate $k^2$ are slackened sufficiently to allow the cylinder $h^1$ to turn. I next clamp the foot $e^3$ by means of the nut $g^3$ to secure the frame $f^3$ rigidly in position. I then, by the cross-sight $i^3$, set off a line, A C, at right angles to the line A B, and measure off on this line any desired length A C—say one hundred yards—and set up the distancer vertically over the point C. I then adjust or level the table $e$ and turn it until the line $a'$ agrees with the line A C, which will be easily determined by sighting the cross staff through the sighting device $s$, when it is turned to rest against the stop $b'$. In cases where the points A and C are very unequal in level the line $a'$ of the distancer may be made to agree with the line A C by setting the sighting device $s$ into the position shown in Fig. 1, and then turning the table $e$ so as to sight the point A, inclining the table, if necessary. A picket or pole is set up at H in the line A C, so as to be within the line of sight, the sighting device $s$ is turned to rest against the stop $b'$, and the table $e$ turned until the device $s$ fairly sights the pole at H, thus bringing the axial line $a'$ fairly over the line A C. The sighting device $s$ is then turned to sight the fort B by the mechanism operated by the milled heads $n$ $n$. The pointer $k$, being moved by the same mechanism, rests opposite one of the gradations of the circles $e$, and thus indicates the number of times that the base or line A C is contained in the perpendicular line A B, or the tangent of the angle through which the sighting device has been moved.

Having obtained the distance from A to B, we will suppose that it is next required to know the difference in height between these two points. To determine this, the table $e$ is turned to sight the fort at B with the sighting device $s$, and the amount of inclination of the table $e$ is measured on the scale $k'$, which we will suppose to be at a distance of four inches from the axis $a'$. (See Fig. 6.) The length of the hypotenuse C B of the triangle A B C, Fig. 14, is then found, which may be readily done, as the lengths of the sides A B and A C are known. Then, as four inches are to the number of inches contained in the hypotenuse B C, so is the amount indicated on the scale $k'$ of inclination of the table $e$ to the length of the line B D required, Fig. 15. In other words, the scale indicates the vertical movement of the line of sight. The line A D represents a level line from the sighting device $s$.

In like manner the distance and height of the point E, which we will suppose to be a tree on a hill, can be obtained, and by the scale of degrees $d^3$ on the plate $c^3$ (see Fig. 12) the angle B A E will be measured on the cross-staff, so that, having the length of the lines A B and E A and the angle B A E, the distance of the point E from the point B can be obtained in the ordinary manner. The difference in height between the point E and the point A can be obtained as before, and from this can be found the difference in height between the points B and E, and likewise data may be obtained of any distant object, and this with much greater ease and rapidity than heretofore and without approaching near to the distant points.

I would remark that by properly arranging the position of the pointer $k$ on the spindle $h$ and of the sighting device $s$ on the spindle $q$, so that the pointer $k$ rests against the spindle $q$, as in the position shown at Fig. 7, the sighting device $s$ will be exactly at right angles to the line $a'$, and may be so set at any time by bringing the pointer $k$ to this position.

The scale $c^4$ of degrees on the cross-staff (see Fig. 12) is given, so that the angle of inclination of the sight of the cross-staff from the level to the line of sight of the distant object may be measured, and by the ordinary calculation the height above or depth below the datum-line, as taken by the distancer in the manner hereinbefore described, may be verified, if desired. Otherwise this scale is not required. The difference of height between the points A and C, where such exists, must be obtained and accounted for.

It will be observed that in the description above given, and in the drawings hereunto annexed, the base A C is laid off to the right of the point A, and that all the angles of the line C' C², &c., are taken by turning the sighting device $s$ toward the left side of the distancer. (See Fig. 1.)

If it is desired to lay off the base A C to the left of the point A as well as to the right, a second circle with reverse graduation must be provided on the table $e$. Thus the graduation $i^5$ will be correspondingly to the left of the sighting device $s$ and the graduation $k^5$ correspondingly to the right of the device $s$, and so on for all the rest of the graduations with which the table may be provided.

It is evident that when the base A C is very long, and from the nature of the ground difficult to measure by a chain or any other line, it may be measured and set off in substantially the same manner as that described for measuring the distances on the line A B.

What I claim, and desire to secure by Letters Patent, is as follows:

1. In surveying apparatus, a cross-staff having two sighting devices connected together with their lines of collimation intersecting, in combination with a distancer having a sighting device fitted to rotate on a table in a plane parallel thereto, a base or datum line marked upon the table over which the sighting device can be set, a rotating pointer, connecting-gears between the sighting device and pointer, and a divided circle graduated and marked to indicate the tangents of the angles between the sighting-lines and base-line.

2. In surveying apparatus, a cross-staff having two sighting devices connected together at right angles and supporting-frames in which they are held, whereby they may be rotated in planes at right angles to one another, the point of intersection of their lines of collimation being the common center upon which they rock, in combination with a distancer having an oscillating table, a sighting device fitted thereon to rotate in a plane parallel to the table, with its axis crossing the axial line of oscillation of the table, a pointer connected to and rotating with the sighting device, and a divided circle on the table graduated and marked to indicate the tangents of the angles through which the sighting device is moved.

3. In surveying apparatus, a cross-staff having two sighting devices connected together at right angles and supporting-frames in which they are held, whereby they may be rotated in planes at right angles to one another, the point of intersection of their lines of collimation being the common center upon which they rock, in combination with a distancer having an oscillating table, a sighting device fitted thereon to rotate in a plane parallel to the table, with its axis crossing the axial line of oscillation of the table, a pointer connected to and rotating with the sighting device, a divided circle on the table graduated and marked to indicate the tangents of the angles through which the sighting device is moved, and a fixed scale in proximity to the table graduated to indicate the vertical movement of the line of sight.

4. In surveying apparatus, in combination, a sighting device fitted to rotate on a table in a plane parallel thereto, a point or datum line marked on the table over which the sighting device can be set, a rotating pointer, connecting-gears between the sighting device and pointer, and a divided circle graduated and marked to indicate the tangents of the angles between the sighting-lines and base-lines.

5. In surveying apparatus, in combination, an oscillating table, a sighting device fitted thereon to rotate in a plane parallel to the table, with its axis crossing the axial line of oscillation of the table, a rotary pointer, multiple gearing connecting the pointer and the sighting device, a divided circle on the table graduated and marked to indicate the tangents of the angles through which the sighting device is moved, and a fixed scale in proximity to the table graduated to indicate the vertical movement of the line of sight.

6. In surveying apparatus, in combination, two sighting devices connected together at right angles and supporting-frames in which they are held, whereby they may be rotated in planes at right angles to one another, the point of intersection of their lines of collimation being the common center upon which they rock.

7. In surveying apparatus, in combination, a frame fitted to rotate on a vertical axis, a short cylinder held therein and free to rotate in a vertical plane, a sighting device fitted transversely in the cylinder, with its line of collimation intersecting the axis of the cylinder, another sighting device connected to the first one, with its line of collimation at right angles to and intersecting the line of collimation of the first sighting device, and a scale to indicate the angular movement of the cylinder in the fixed frame.

8. In surveying apparatus, in combination, a base-plate provided with a divided circle, a frame fitted to rotate thereon, a short cylinder held in the frame and free to rotate in a vertical plane, two sighting devices connected together at right angles, one of which is fitted transversely in the cylinder, as described, and a scale to indicate the angular movement of the cylinder in its supporting-frame.

9. The cross-staff having cross-sights, as described, in combination with the distancer having the oscillating table *e*, provided with the datum-line *a'*, the sighting device *s*, adapted to be set over the datum line *a'*, the pointer *k*, and the graduated circles *e'*, substantially as described.

10. In combination with a cross-staff constructed and arranged substantially as described, the distancer having the oscillating table *e*, provided with the datum-line *a'*, the graduated circles *e'*, and level *t*, the sighting device *s*, adapted to be set over the datum-line *a'*, cross-bar *b*, frame *f*, having graduated scales *k'*, and level *u*, the whole constructed and arranged substantially as described.

11. In the instrument called the "distancer," the combination of cross-bar *b*, frame *f*, having level *u*, and scales *k'*, table *e*, provided with the datum-line *a'*, and having level *t* and graduated circles *e'* and trunnions *d*, sighting device *s*, adapted to be set over the datum-line *a'*, and pointer *k*, with a mechanism, substantially as described, for actuating the said sighting device and pointer, and mechanism for adjusting the table either to the level or at an inclination, the whole constructed and arranged substantially as shown and described, for the purposes set forth.

12. The combination, in the cross-staff, of the plate $c^3$, having graduated scale of degrees $d^3$, foot $e^3$, frame $f^3$, cylinder $h^3$, plate $k^3$, sight $m^3$, having level $a^4$, and cross-sight $t^3$, the whole constructed and arranged substantially as described, for the purposes set forth.

Signed at Montreal, Province of Quebec, Dominion of Canada, this 18th day of October, 1887.

WILLIAM FARQUHARSON.

In presence of—
ERNEST DOUGLAS WINTLE,
ARTHUR JOHN HOPE.